UNITED STATES PATENT OFFICE 2,125,509

DIAZOBIGUANIDES

Hans Z. Lecher, Plainfield, N. J., assignor to The Calco Chemical Company, Inc., Bound Brook, N. J., a corporation of Delaware No Drawing. Application April 2, 1937,
Serial No. 134,574

20 Claims. (Cl. 260—69)

This invention relates to diazobiguanides and more particularly to biguanides of diazo and tetrazo compounds in which the biguanides does not contain any coupling substituent and the diazo component does not contain a solubilizing group.

The diazobiguanides of the present invention are obtained by the reaction of a diazotized aromatic or heterocyclic amine and biguanide or a derivative in which at least one nitrogen atom has a reactive hydrogen attached to it capable of reacting with the diazo compound. Various kinds of formula numbering have been proposed for biguanide and its derivatives and for the purpose of the present invention, the following formula for biguanide will be used in describing the various compounds which can be used in the invention. The nitrogen atoms are numbered as shown:

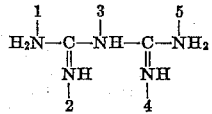

The present invention is not limited to the use of any particular biguanide as it has been found that the class is generally useful. Biguanide itself may be used in reacting with diazo compounds or any of its derivatives so long as the derivative contains at least one reactive hydrogen attached to a nitrogen atom. The substituents in the case of the substituted biguanides may be alkyl, aralkyl, aryl, hydroaryl or heterocyclic so long as they are not groups which themselves are capable of coupling with diazo compounds as for instance aminoaryl or hydroxyaryl radicals will do. A few typical biguanides in addition to biguanide itself, which can be used to form diazobiguanides of the present invention, are the following: 1-methylbiguanide, 1-ethylbiguanide, 1,2-dimethylbiguanide, 1,1,2-trimethylbiguanide, 1,1-diethylbiguanide, 1,5-dimethylbiguanide, 1,1,5,5-tetramethylbiguanide, 1-phenylbiguanide and its homologues, as e. g. 1-(4'-methylphenyl) biguanide, 1-alpha- and 1-betanaphthylbiguanide and their homologues, 1-benzylbiguanide and its homologues, 1-cyclohexyl biguanide and its homologues, heterocyclic biguanides, as e. g. 1,1-cyclopentamethylenebiguanide. In addition to these biguanides, other substituted biguanides such as those having halogen, nitro, alkoxy, carboxylic and sulfonic groups are also suitable. Typical examples of these substituted biguanides are the following: 1-(4'-chlorophenyl) biguanide, 1-(4'-nitrophenyl) biguanide, 1-(4'-methoxyphenyl) biguanide, 1-(4'-carboxyphenyl) biguanide,

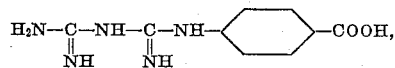

1-(1'-sulfo-2'-naphthyl) biguanide,

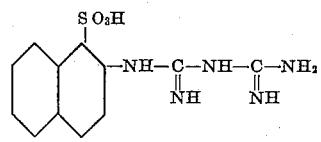

It is an advantage of the present invention that compounds can be produced with practically any diazotized amino compound capable of coupling to form azo compounds. Typical amines which can be diazotized and reacted with biguanides are the following:

Aniline and its homologues, as e. g. the toluidines, 2,4-dimethylaniline; halogen derivatives of aniline and of its homologues, as e. g. the monofluoroanilines, the monochloroanilines, 2,5-difluoroaniline, 2-fluoro-5-chloroaniline, 2,5-dichloroaniline, m-aminobenzo trifluoride, p-aminobenzotrifluoride, 3-amino-chlorobenzotrifluoride, 2-methyl-3-chloroaniline, 2-methyl-4-chloroaniline, 2-methyl-5-chloroaniline, 3-methyl-4-chloroaniline, 5-methyl-2-chloroaniline, 2-methyl-4-chloro-5-bromoaniline, 2-methyl-4,5-dichloroaniline, 4-methyl-2,5-dichloroaniline; nitro-derivatives of aniline and of its homologues and their halogen derivatives, as e. g. the nitroanilines, 2-methyl-4-nitro-aniline, 2-methyl-5-nitro-aniline, 4-methyl-2-nitro-aniline, 2-nitro-4-fluoroaniline, 2-nitro-4-chloroaniline, 3-nitro-4-chloroaniline, 4-nitro-2-chloroaniline; ether derivatives of primary aromatic amines and their halogen derivatives, as e. g. o-anisidine, 2-methoxy-5-methyl aniline, 2,5-dimethoxy-aniline, 2-methoxy-1-naphthylamine, 2-amino-diphenylether, 2-amino-4-acetyl-diphenylether, benzyl-2-aminophenyl-ether, 3-fluoro-4-methoxy-aniline, 2-methoxy-5-chloroaniline, 2,5-dimethoxy-4-chloroaniline, 2-methoxy-4-chloro-5-methyl-aniline, 2-methoxy-5-bromoaniline, 3-bromo-6-ethoxy-aniline, 4-chloro-2-amino-diphenylether, 4-amino-2-chloro-diphenylether, 4-amino-4'-chloro-diphenylether, 4,4'-dichloro-2-amino-diphenylether, 2,2',5'-trichloro-4-amino-diphenylether; ether-derivatives of aniline and its homologues containing nitro groups, as e. g. 2-methoxy-4-nitro-aniline, 2-methoxy-5-nitro-aniline, 2-nitro-4-methoxy-aniline, 2-methoxy-4-nitro-5-methyl-aniline; monoacyl-derivatives of aromatic diamines, as e. g. N-hexahydrobenzoyl-p-phenylene diamine, N-hexahydrobenzoyl-p-toluylene diamine, N-benzoyl-p-phenylene diamine; monoacyl-derivatives of diamino-phenolethers, as e. g. 2-benzoylamino-4-amino-anisole, 2-hexahydrobenzoylamino-5-amino-anisole, 2-amino-5-benzoylamino-hydroquinone dimethylether and diethylether, 2-amino-5-hexahydrobenzoylamino-hydroquinone dimethylether and diethylether, 2-amino-5-butyrylamino-hydroquinone dimethylether and diethylether, 2-amino-5-phenoxyacetylamino-hydroquinone diethylether, the monomethyl and the mono-benzyl- and the monophenyl-urethane of 2,5-diamino-hydroquinone dimethylether and diethylether, 1-amino-3-benzoylamino - 4,6 - dimethoxybenzene; analoguos monoacyl-derivatives of 2,5-diamino-4-alkoxytoluenes and of 2,5-diamino-4-alkoxy-chlorobenzenes and of 2,5-diamino-4-alkoxy-benzene sulfodialkylamides; analogous monoacyl-derivatives of 1,3-diamino-4,6-dimethylbenzene; the diethylamide of 3-amino-4(4'-chlorophenoxy)-benzoic acid; mono-acyl-derivatives of diamino-p-chlorophenyl-ethers, as e. g. 2-amino-4-chloro-5-acetylamino-diphenylether, 2-benzoylamino-4-chloro-5-amino-anisole; amino-derivatives of aromatic sulfones, as e. g. 3-amino-4-methyl-diphenyl sulfone, 2-amino-4'-methyl-diphenyl sulfone, 2-amino-4-acetyl-diphenyl sulfone, the ethyl ester of 3-amino-4-(p-toluene-sulfonyl)-benzoic acid, 4-methoxy-3-amino-phenyl-ethyl sulfone, (4-methoxy-3-amino-phenyl)-benzyl sulfone, 4-ethoxy-3-amino-diphenyl sulfone, 2-amino-4-(trifluoromethyl)-phenyl-ethyl sulfone; aminoderivatives of aromatic dialkylsulfonamides, as e. g. 3-amino-4-methyl-benzene dimethylsulfonamide and diethylsulfonamide, 3-amino-4-methoxy-benzene diethylsulfonamide; xenylamine; alpha and beta naphthylamine; alpha amino-anthraquinone; 2-amino-3-nitro-fluorene and 2-amino-3-nitro-fluorenone; amino-diarylamines and their ether-derivatives and their nitro-derivatives, as e. g. 2-methoxy-5-amino-diphenylamine, 4-methoxy-4'-amino-diphenylamine, 4-ethoxy-4'-amino-diphenylamine, 3,4'-dinitro-4-amino-diphenylamine; amino-azo-compounds, as e. g. 3,2'-dimethyl-4-amino-azobenzene, 2-methyl-4-amino-5-methoxy-4'-chloro-azobenzene, 4-amino-4'-nitro-3-methoxy-6-methyl-azobenzene, 4-amino-4'-nitro-2,5-dimethoxy-azobenzene, 4-amino-4'-chloro-3-methoxy-6 - methyl - azobenzene, the azodye: diazotized o-anisidine coupled onto alpha-naphthylamine.

There are numerous aromatic diamines in which only one of the amino groups is diazotized and such amino diazo compounds may also be condensed with biguanides to form products of the present invention. An example of this type of amine is 2,6 dichloro 1,4 phenylene diamine.

Diamines in which both amino groups are diazotized to form tetrazo compounds will also condense with biguanides. Typical amines of this class are paraphenylene diamine, benzidine, ortho tolidine, orthodianisidine, 4,4' diaminostilbene, 4,4' diaminodiphenylamine, 2,2' dimethyl - 4,4' diaminodiphenylamine, 1,5 diaminonaphthalene.

Diazo and tetrazo compounds of heterocyclic amines can also be condensed with biguanides in accordance with the present invention. Typical heterocyclic amines are 2-aminocarbazole, 3,6-diaminocarbazole, 2-nitro-3-aminocarbazole, 2-nitro-3-aminodibenzofuran, 2-amino-3-nitrodibenzothiophene, 1-amino-5-fluorobenzothiazole

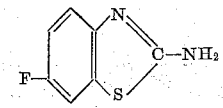

The condensation of diazo and tetrazo compounds with biguanides should normally be carried out in a slightly alkaline medium although with certain diazo and tetrazo compounds in which the formation of the iso-diazotate takes place very readily, a slightly acid medium can be used and is in fact preferable. An example of a compound where a slightly acid medium can be used effectively is diazotized 2,5 dichloraniline.

The temperature at which the reaction between the diazo compound and the biguanide takes place will, of course, vary with the stability of the diazo compound used. However, in general it is advantageous to keep the temperature low.

The reaction does not require a critical proportion of reagents but best results are normally obtained if the biguanide compound is used in excess. The unreacted biguanide can be easily recovered. The particular conditions for best results will vary slightly, of course, with different compounds. However, it is an advantage of the present invention that none of the reactions are critical and good yields can be obtained with a minimum of supervision once the best operating conditions have been determined.

Diazobiguanide compounds which do not contain carboxylic, sulfonic or other solubilizing groups are not soluble in alkali or water and therefore precipitate out as soon as they are formed. Those which contain solubilizing groups of the acid type are more or less soluble in alkali but they may be salted out as sodium salts or may be precipitated out as insoluble internal salts by using very weak acids. Diazobiguanides in which the diazo component contains a nitro group in para position tend to be soluble in alkali, usually with a red color. This solubility is probably caused by a tautomeric change in the structure of the compound.

The diazobiguanides of the present invention retain to a certain degree the basic character of the original biguanides. Some of them form unstable hydrochlorides when treated with hydrogen chloride in anhydrous organic solvents and their sulfonic acids are not water soluble but form internal salts with the basic portion of the molecule.

The exact formula of the diazobiguanides has not as yet been established as it has hitherto not been possible to determine exactly the position of the diazo group in the biguanide molecules where several replaceable hydrogen atoms are available.

Most of the simple diazobiguanides are yellow in color but some, particularly nitro substituted compounds, show a deeper color. The best organic solvents for the diazobiguanides are polar solvents such as pyridine, piperidine, glycol monoethyl ether (Cellosolve), dioxane, ethyl acetate, acetone and similar compounds. The diazobiguanides show only slight solution in nonpolar organic solvents such as benzene. The solutions in some organic solvents possess the unusual property of spontaneous precipitation of the diazobiguanide after standing for some time. The reasons for this peculiar behavior have not as yet been determined.

The diazobiguanides of the present invention are very stable even at elevated temperatures and are not explosive, which is an important property, as many diazo compounds present a considerable explosion hazard. Another very important property of the diazobiguanides of the present invention is their stability against hydrolysis by water and alkali, many of them even withstanding boiling with aqueous or alcoholic alkali. On the other hand, they are readily split by acids in aqueous solution regenerating the diazo component and the acid salt of the biguanide. The ease with which this acid splitting takes place differs of course with different compounds having various components in the molecule. In every case, heating with acetic acid is sufficient, which makes it unnecessary to use very strong acid reagents, an important advantage because the stabilized diazobiguanide compounds can be used in printing and it is unnecessary to regenerate the compounds with reagents of excessive strength.

A preparation of the typical diazobiguanides of the present invention will be illustrated in the following specific examples, it being understood, of course, that the invention is not broadly limited to particular details therein set forth. The parts are by weight, corresponding to parts by volume of water.

*Example 1.*—39 parts by weight (2 mols) of commercial 2-methyl 5-chloro-aniline hydrochloride are slurred with 200 parts by volume of water and 80 parts by volume of 5N-hydrochloric acid. This mixture is diazotized with 200 parts by volume of 1N-sodium nitrite solution at about 5° C. The filtered diazo solution is run quickly into a solution containing 130.2 parts by weight of acid biguanide sulfate (6 mols), 400 parts by volume of water, and 280 parts by volume of 5N-sodium hydroxide, while the mixture is stirred and the temperature kept at about 10° C. Soon a yellow precipitate forms. After one hour the product is filtered off, washed with water and dried. As the product is not very sensitive, the drying operation may be carried out even at 100° C.

The excess biguanide is recovered from the mother liquor by precipitation with an ammoniacal solution of copper sulfate; the biguanide is precipitated as the sulfate of copper-biguanide. By treating this compound with hydrogen sulfide or sodium sulfide, copper sulfide is precipitated, and acid biguanide sulfate is precipitated from the mother liquor upon the addition of sulfuric acid.

The 2'-methyl-5'-chloro-benzene-diazo-biguanide is a light yellow powder almost insoluble in water and alkali. It is only slightly soluble in benzene, somewhat more soluble in ether and easily soluble in ethyl acetate, dioxane, acetone, glycol ethyl ether, pyridine, piperidine. However, after a short while most of these solutions reprecipitate the dissolved compound in the form of yellow needles.

The compound is very stable in an alkaline medium and may be even boiled with caustic alkali for a while without decomposition. The compound is a base because it gives a hydrochloride when treated with hydrogen chloride in anhydrous solvents like ether or dioxane. It dissolves in cold glacial acetic acid and is reprecipitated by water. Aqueous acids split it into the corresponding diazonium salt and biguanide salt. When a glacial acetic acid solution of the diazo-biguanide and of beta-naphthol is boiled for a short time the azo dye forms and is precipitated upon dilution with water; the corresponding amount of biguanide can be easily recovered from the filtrate as acid sulfate.

The isomeric 2'-methyl-4'-chloro-benzene-diazo-biguanide is prepared by exactly the same method. This compound when crystallized from dioxane gives the following figures on analysis:

|    | Calculated | Found |
|----|------------|-------|
| C  | 42.6       | 42.5  |
| H  | 4.73       | 4.2   |
| N  | 38.65      | 38.4  |
| Cl | 14.0       | 13.3  |

The diazo compounds of the following amines can also be condensed with biguanide in the same manner: 2-methoxy-5-chloro-aniline, o, m, p-chloro-aniline, aniline, p-toluidine, o-anisidine, xenylamine, 2-methyl-5-nitro-aniline.

*Example 2.*—32.4 parts by weight of 2,5-dichloro-aniline are dissolved in a hot mixture of 400 parts by volume 5N-hydrochloric acid and 600 parts by volume of water. The mixture is chilled to 10° C. by the addition of ice. 14 parts by weight of sodium nitrite are added gradually with stirring to this slurry of hydrochloride crystals. After one hour, 1000 parts by volume 2N-sodium acetate solution are added. The filtered diazo solution is run quickly into a solution of 130.4 parts by weight of acid biguanide sulfate, 64 parts by weight of anhydrous sodium carbonate and 800 parts by volume of water at room temperature. While being stirred, the mixture is gradually warmed to about 30° C. and then 400 parts by volume of 2N-sodium acetate solution and 600 parts by volume of 2N-sodium carbonate solution are added to reduce the acidity to a faint test on blue litmus paper. A yellow precipitate forms which is filtered off after about 5 hours, washed with water and dried.

The 2'-5'-dichloro-benzene-diazo-biguanide also is a yellow powder of similar properties to those mentioned for the preceding compounds. However, it is somewhat less readily split by weaker acids. It will be noted that in the preparation of this compound the condensation is carried out in a weakly acid medium to avoid the formation of the isodiazotate which takes place very easily in this particular case.

*Example 3.*—4.56 parts by weight of 2-methyl-4-nitro aniline are dissolved in a hot mixture of 30 parts by volume 5N-hydrochloric acid and 30 parts by volume of water. The solution is cooled to 5° C. 30 parts by volume of 1N-sodium nitrite solution are then added to the thick slurry at once. After the diazotization is complete, some of the acid is neutralized by addition of 12 parts by volume 5N-sodium hydroxide solution. The filtered diazo solution is quickly run into a solution of 19.5 parts by weight of acid biguanide sulfate, 42 parts by volume of 5N-sodium hydroxide solution, and 60 parts by volume of water. The temperature is kept at 10° C. and the mixture is stirred at this temperature for about one hour. An orange precipitate forms which is filtered off and washed with water and dried in the vacuum oven at about 50° C.

The orange microcrystalline powder is slightly soluble in water with a yellow color and is easily soluble in diluted caustic solution with a red color.

By an analogous procedure, a diazo biguanide may be prepared from 2-methoxy-4-nitro-aniline. The behavior of this compound is similar.

Diazo-biguanides which contain a nitro group in para-position to the amino group are easily split into their components and are not quite as stable as other diazo-biguanides in alkaline solutions containing coupling components.

*Example 4.*—12.2 parts by weight of o-dianisidine are slurried in 60 parts by volume of 5N-hydrochloric acid and 200 parts by volume of water and this slurry is tetrazotized with 100 parts by volume of 1N-sodium nitrite solution at 5° C. The diazo solution is quickly run into a solution prepared from 65.1 parts by weight of acid biguanide sulfate and 140 parts by volume of 5N-sodium hydroxide solution. The mixture is stirred and kept at about 10° C. After 20 minutes, the precipitate formed is filtered off, washed with water and vacuum dried at 40° C. This diazo-biguanide is an orange yellow powder. It is somewhat more slowly split into its components than the other diazo-biguanides mentioned above.

*Example 5.*—9.8 parts by weight of 2-methyl-5-chloro-aniline hydrochloride are diazotized according to the method described in Example 1. The filtered diazo solution is run quickly into a solution of 36 parts by weight of acid 1-methyl-biguanide sulfate sesquihydrate, 70 parts by volume of 5N-sodium hydroxide solution and 100 parts by volume of water. The mixture is stirred and kept at approximately 10° C for 2¾ hours. The precipitate obtained is filtered off, washed with water and dried.

The compound is a bright yellow powder similar in its properties to the product obtained in Example 1. In an analogous manner, the diazo-compound of 2-methyl-5-chloro aniline is condensed with 1,1-diethyl biguanide and 1,1-cyclopentamethylene biguanide both of which are employed in the form of the acid sulfates. The products obtained are bright yellow powders similar in their properties to the diazo-biguanides described in Example 1.

*Example 6.*—9.8 parts by weight of 2-methyl-5-chloro aniline are dissolved in 20 parts by volume 5N-hydrochloric acid and 100 parts by volume of water. The mixture is ice cooled to 5° C. and diazotized with 50 parts by volume of 1N-sodium nitrite solution. The filtered diazo solution is run quickly into a slurry of 44.2 parts by weight of 1-phenyl biguanide and 200 parts by volume of water at approximately 10° C. The mixture is stirred for ½ hour and the bright yellow precipitate is filtered off and washed with warm water in order to remove the excess phenyl biganide. It is vacuum dried at 50° C. This compound also is a bright yellow powder. It is more easily split in its components than the corresponding methyl derivative.

*Example 7.*—1.965 parts by weight of the hydrochloride of 2-methyl-5-chloro aniline diazotized in the usual manner. The filtered diazo solution is run quickly into a solution of 7.92 parts by weight of the dihydrochloride of 1-benzyl biguanide in 200 parts by volume of water and 14 parts by volume of 5N-sodium hydroxide at a temperature of approximately 10° C. After ½ hour the yellow precipitate is filtered off, washed and dried in the vacuum oven.

*Example 8.*—The diazo compound of 2,5-dichloroaniline is prepared and condensed with the following biguanides according to the procedure described in Example 2: 1-methyl biguanide, 1,1-diethyl biguanide, 1,1-pentamethylene biguanide. Three equivalents of the biguanide compound are used in the first two cases and two equivalents in the last one. The diazo biguanides obtained are similar to the compound described in Example 2.

*Example 9.*—8.2 parts by weight of 2,5-dichloroaniline are diazotized in the customary manner with 100 parts by volume 5N-hydrochloric acid, 150 parts by volume of water and 3.5 parts by weight of sodium nitrite. After the addition of 75 parts by volume of 5N-sodium hydroxide solution and after being filtered, the diazo solution is quickly run into a solution of 44.2 parts by weight of 1-phenyl biguanide in 750 parts by volume of water. During this operation the solution is stirred and kept at 45° C. After 15 minutes, the yellow precipitate formed is filtered off, washed with warm water and dried in the vacuum oven at 50° C.

*Example 10.*—8.4 parts by weight of 2-methoxy-4-nitro-aniline are diazotized as in Example 3, 50 parts by volume of 5N-hydrochloric acid and 50 parts by volume of 1N-sodium nitrite solution being used. After the addition of 20 parts by volume 5N-sodium hydroxide solution and after being filtered, the diazo solution is quickly run into a solution of 44.2 parts by weight of 1-phenyl biguanide in 750 parts by volume of water. The mixture is stirred and kept at 10° C. After 25 minutes the precipitate formed is filtered off and dried in the vacuum oven at about 50° C. The product is somewhat more easily split in its components than the products mentioned in Example 1.

In an analogous manner the diazo compound of 2-methyl-4-nitro aniline may be condensed with 1-phenyl biguanide.

The great majority of the diazobiguanides do not couple with enolic or phenolic coupling components in a basic medium. Most of such mixtures are extremely stable and are particularly useful for producing azo-pigments on the printed fiber, especially on cellulosic fiber. For this purpose a suitable enolic or phenolic coupling component free from solubilizing groups as sulfonic or carboxylic groups is used, as e. g. an arylide of aceto-acetic acid, an arylide of 2-hydroxy-3-naphthoic acid, an arylide of a suitable hydroxy-carbazole carboxylic acid or hydroxy-naphthocarbazole carboxylic acid, 1-phenyl-3-methyl-5-pyrazolone, and similar coupling components used in making "Ice-Colors". The alkaline mixture of the diazobiguanide and of such a coupling component is made up to a printing paste, the fiber is printed and the azo-pigment is developed in an acid bath or by acid steam, e. g. by steam mixed with vapors of formic or acetic acid.

The diazobiguanides which are not soluble in alkali have first to be converted to a stable finely dispersed form. This is done, e. g. by treating them with a deflocculating agent and a protective colloid; a wetting agent and a hydrotropic substance also may be added. Even when the diazo compounds are not soluble as such, on acid splitting they produce soluble diazo compounds which penetrate the fiber sufficiently to produce a homogeneous noncrocking print. The insolubility which many of the diazobiguanides show has been found to have the advantage that the corresponding mixtures with the coupling components are much more stable and can be kept for a much longer time than analogous mixtures containing soluble compounds. Also the undeveloped prints are extremely stable.

The following examples illustrate this application of the diazobiguanides.

*Example 11.*—An intimate mixture of 68 parts by weight 2-methyl - 5 - chloro-benzene-diazobiguanide, 61.4 parts by weight of the o-phenetidide of 2,3 hydroxy-naphthoic acid, 6 parts by weight of "Tamol" (sodium salt of disulfodinaphthylmethane), and 4 parts by weight of trisodium phosphate is mixed in a dough mixer with 140 parts by volume of water; then 80 parts by weight of dextrine are added and the mixing is continued until a smooth, rather thick paste is obtained. This paste is then dried, preferably in a vacuum oven at 40–50° C. and finely ground. A light yellow powder is obtained which easily disperses in water. A printing paste may be made as follows: 5 parts by weight of the powder obtained is stirred with 43 parts by volume of water and 6 parts by weight of a 20% sodium hydroxide solution. Then 5 parts by weight of glycolmonoethyl ether are added and finally 41 parts by weight of the customary starch gum tragacanth thickener. The resulting yellow paste is remarkably stable and can be kept for months without decomposition. The print is made in the usual manner, dried and aged with steam containing vapors of acetic acid. The cloth is then rinsed, soaped and dried. A bright scarlet is produced.

*Example 12.*—A printing paste is made by the procedure of Example 11 from 12.7 parts by weight of 3-chlorobenzene diazobiguanide, 3.9 parts by weight of the orthotoluidide of 2,3 hydroxy-naphthoic acid, 1.5 parts by weight of "Tamol", 1.0 parts by weight of trisodium phosphate, 35 parts by volume of water and 24.6 parts by weight of dextrine in the first step. The second step and the printing is carried out as in Example 11. A bright orange color is produced.

*Example 13.*—A printing paste is made by the procedure in Example 11 from 6.1 parts by weight of 2'-methyl-5'-chlorobenzene-diazo-1-methylbiguanide, 5.6 parts by weight of the o-toluidide of 2,3 hydroxy-naphthoic acid, 0.6 parts by weight of "Tamol", 0.4 part by weight of trisodium phosphate, 35 parts by volume of water, and 9 parts by weight of dextrine in the first step. The second step and the printing is carried out as described in Example 11. A bright red is produced.

I claim:

1. A diazobiguanide included in the group consisting of aromatic diazo and tetrazobiguanides and heterocyclic diazo and tetrazobiguanides, the biguanide portion of the molecule being free from substituents capable of coupling with diazo compounds and the diazo containing radicals being free from sulfonic and carboxylic groups.

2. A diazobiguanide included in the group consisting of aromatic diazo and tetrazobiguanides, the biguanide portion of the molecule being free from substituents capable of coupling with diazo compounds and the diazo containing radicals being free from sulfonic and carboxylic groups.

3. A diazobiguanide having the formula

in which R belongs to the group consisting of aromatic and heterocyclic radicals free from carboxylic and sulfonic groups and B is a biguanide radical free from substituents capable of coupling with diazo compounds to form azo dyes.

4. A diazobiguanide having the formula

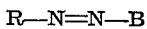

in which R is an aromatic radical free from carboxylic and sulfonic groups, and B is a biguanide radical free from components capable of coupling with diazo compounds.

5. A diazobiguanide included in the group consisting of aromatic diazo and tetrazobiguanides and heterocyclic diazo and tetrazobiguanides, the biguanide portion of the molecule being free from substituents capable of coupling with diazo compounds, and the whole molecule being free from sulfonic and carboxylic groups.

6. A diazobiguanide included in the group consisting of aromatic diazo and tetrazobiguanides, the biguanide portion of the molecule being free from substituents capable of coupling with diazo compounds, and the whole molecule being free from sulfonic and carboxylic groups.

7. A diazobiguanide having the formula

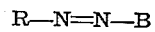

in which R belongs to the group consisting of aromatic and heterocyclic radicals free from carboxylic and sulfonic groups and B is a biguanide radical free from components capable of coupling with diazo compounds to form azo dyes, and is also free from sulfonic and carboxylic groups.

8. A diazobiguanide having the formula

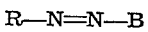

in which R is an aromatic radical free from carboxylic and sulfonic groups, and B is a biguanide radical free from components capable of coupling with diazo compounds to form azo dyes, and is also free from sulfonic and carboxylic groups.

9. 2-methyl-5-chlorodiazobenzene biguanide having the formula

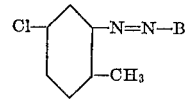

in which B is biguanyl.

10. 3-chlorodiazobenzene biguanide having the formula

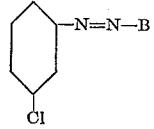

in which B is biguanyl.

11. 2-methoxy-5-chlorodiazobenzene biguanide having the formula

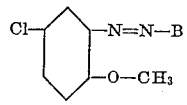

in which B is biguanyl.

12. A process of producing diazobiguanides which comprises bringing about reaction between a compound free from sulfonic and carboxylic groups and having at least one diazo group capable of coupling and a biguanide having at least one reactive hydrogen attached to a biguanide nitrogen atom, the biguanide being also free from substituents which couple with diazo compounds, the reaction taking place in an aqueous medium which is not strongly acid to litmus.

13. A process of producing diazobiguanides which comprises bringing about reaction between a compound free from sulfonic and carboxylic groups and having at least one diazo group capable of coupling and a biguanide having at least one reactive hydrogen attached to a biguanide nitrogen atom, the biguanide being also free from substituents which couple with diazo compounds, the reaction taking place in an aqueous medium which is alkaline.

14. A process of producing diazobiguanides which comprises bringing about reaction between a compound free from sulfonic and carboxylic groups and having at least one diazo group capable of coupling and a biguanide having at least one reactive hydrogen attached to a biguanide nitrogen atom, the biguanide being also free from substituents which couple with diazo compounds, the reaction taking place in an aqueous medium which is weakly acid to litmus.

15. A method according to claim 12 in which the biguanide compound is in excess.

16. A method according to claim 13 in which the biguanide compound is in excess.

17. A method according to claim 14 in which the biguanide compound is in excess.

18. A dispersible diazobiguanide included in the group consisting of aromatic diazo and tetrazobiguanides and heterocyclic diazo and tetrazobiguanides, the biguanide portion of the molecule being free from substituents capable of coupling with diazo compounds, and the whole molecule being free from sulfonic and carboxylic groups, in which the individual pigment particles have been deflocculated and coated with an adherent film of hydrophilic protective colloid.

19. A dispersible diazobiguanide included in the group consisting of aromatic diazo and tetrazobiguanide, the biguanide portion of the molecule being free from substituents capable of coupling with diazo compounds, and the whole molecule being free from sulfonic and carboxylic groups in which the individual pigment particles have been deflocculated and coated with an adherent film of hydrophilic protective colloid.

20. A dispersible diazobiguanide having the formula $$R-N=N-B$$

in which R is an aromatic or heterocyclic radical free from sulfonic and carboxylic groups, and B is a biguanide radical free from substituents capable of coupling with diazo compounds and is also free from sulfonic and carboxylic groups, in which the individual pigment particles have been deflocculated and coated with an adherent film of a hydrophilic protective colloid.

HANS Z. LECHER.

CERTIFICATE OF CORRECTION.

Patent No. 2,125,509. August 2, 1938.

HANS Z. LECHER.

It is hereby certified that error appears in the printed specification of the above numbered patent requiring correction as follows: Page 1, second column, line 30, for "3-amino-chlorobenzotrifluoride" read 3-amino-4-chlorobenzotrifluoride; page 3, first column, line 32, for the word "slurred" read slurried; and that the said Letters Patent should be read with this correction therein that the same may conform to the record of the case in the Patent Office.

Signed and sealed this 27th day of September, A. D. 1938.

Henry Van Arsdale (Seal) Acting Commissioner of Patents.